F. MOORE.
Machine for Filing Gin Saws.

No. 230,037. Patented July 13, 1880.

Witnesses:
Wm. W. Mortimer.
Otto Stein.

Inventor:
Franklin Moore,
per
J. A. Lehmann, atty.

UNITED STATES PATENT OFFICE.

FRANKLIN MOORE, OF HORN LAKE, MISSISSIPPI.

MACHINE FOR FILING GIN-SAWS.

SPECIFICATION forming part of Letters Patent No. 230,037, dated July 13, 1880.

Application filed January 14, 1880.

*To all whom it may concern:*

Be it known that I, FRANKLIN MOORE, of Horn Lake, in the county of De Soto and State of Mississippi, have invented certain new and useful Improvements in Machines for Filing Gin-Saws; and I do hereby declare the following to be a full, clear, and exact description of the invention, such as will enable others skilled in the art to which it pertains to make and use it, reference being had to the accompanying drawings, which form part of this specification.

My invention relates to an improvement in machines for filing gin-saws; and it consists in the combination of a frame which has slits cut in the front end for fitting down over the saw to hold it rigidly while being filed with a reciprocating file-holder which operates the feed at the same time that it does the file, and which holder can be given a variable stroke, so that the feed will operate equally as well upon saws of different sizes and having different-sized teeth, as will be more fully described hereinafter.

Figure 1:
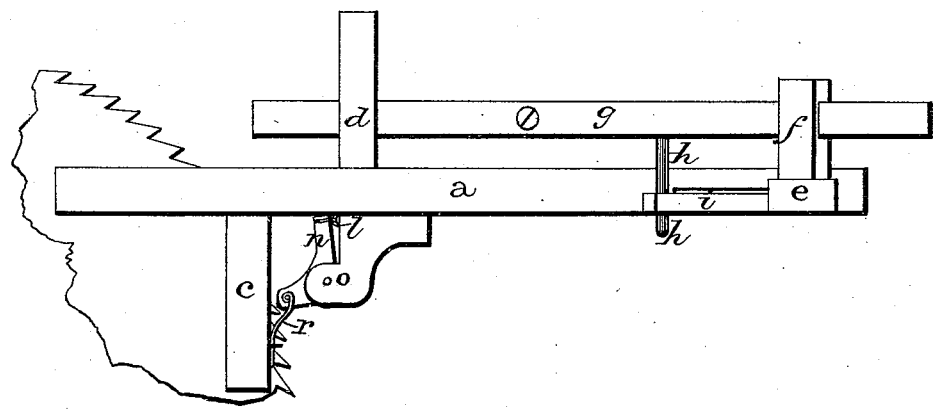
Figure 2:
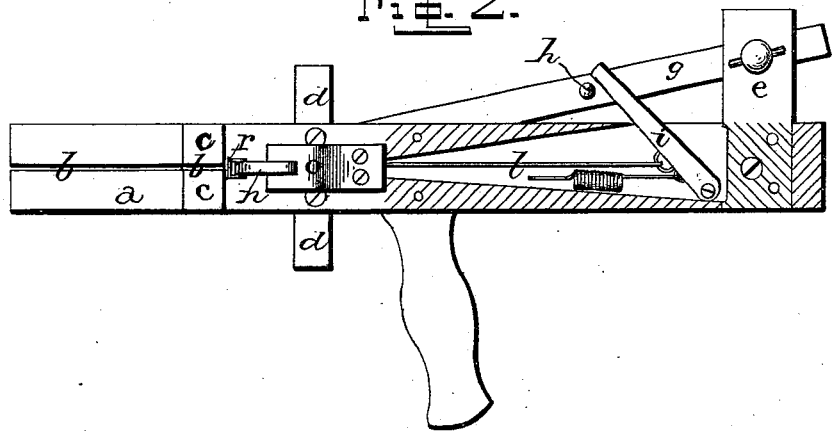
Figure 3:
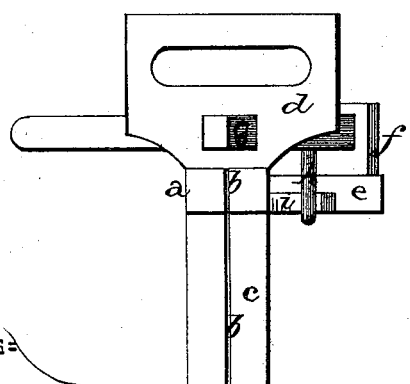

Figure 1 is a side elevation of my machine. Fig. 2 is an inverted view of the same, partly in section; and Fig. 3 is an end view of the same.

$a$ represents the stock, of any desirable length, and which forms the frame upon which the other parts of the machine are supported. Secured to the under side of this stock, and at right angles thereto, is a brace, $c$, and both the ends of this stock and this brace have a slot, $b$, made through them, so as to fit down over the edge of a gin-saw, as shown in Fig. 1, so as to hold the saw steady and prevent any vibration while being sharpened. When the saw is not thus held while being sharpened, the shaking and vibration of the saw is so great that much of the effect of the file is lost. These slots are especially useful where the saw is being sharpened on the cylinder or shaft, so as to save the trouble of having to remove each one.

Upon the top of the stock are secured the two guides $d\,f$, through which the file-handle $g$ plays freely back and forth. These two guides are not set in line with each other; but the rear guide is placed on an extension or arm, $e$, which extends out at right angles to the stock from its rear end, so that the file will work back and forth diagonally across the teeth of the saw, in the usual manner.

Projecting down from the under side of the file-handle is a stud or arm, $h$, which, as the handle $g$ is being worked back and forth, strikes against the lever $i$, which is pivoted to the stock at its inner end. Secured to this lever $i$ is a spring, which draws the lever back into position again as soon as the handle $g$ is drawn forward. Also fastened to the lever $i$ is a connecting-rod, $l$, which has its front end fastened to the L-shaped lever $n$. This lever $n$ is pivoted in the hanger $o$, which is secured to the under side of the stock, and which lever has the loop $r$ fastened to its lower end, for the purpose of alternately catching in the teeth of the saw and turning the saw gradually around, so as to present each tooth in its turn to the action of the file. This loop is made of wire, and held against the brace by means of a staple, and at each downward stroke this loop catches under another tooth, for the purpose of drawing the saw around just far enough to present a new tooth to the file. The distance this loop shall move is regulated entirely by the length of the stroke of the file-holder, so that by giving the holder a longer or shorter movement saws having large teeth and saws having small teeth can be sharpened equally as well.

By means of the mechanism above described, as the file is moved backward for another stroke, this backward movement is made to operate the feeding devices for moving the saw, and thus the saw is fed forward tooth by tooth.

Heretofore the file has been reciprocated by means of a crank, which gives a uniform length of stroke, and hence the feed, which is operated by the file-holder, also has only one length of stroke, and so is adapted to saws having one size of teeth only.

My machine is an improvement over such machines in being able to vary the length of stroke of the file and the feeding devices, whereby saws having different-sized teeth can be filed equally as well.

Having thus described my invention, I claim—

The combination of the stock $a$, having the slit $b$, slotted piece $c$, guides $d$ $f$, file-handle provided with arm $h$, levers $i$ $n$, rod $l$, and loop $r$, substantially as described.

In testimony that I claim the foregoing I have hereunto set my hand this 1st day of January, 1880.

F. MOORE.

Witnesses:
  J. A. TORIAN,
  J. M. ROBERTSON.